United States Patent [19]

Axelrod

[11] 4,385,146

[45] May 24, 1983

[54] MODIFIED POLYPHENYLENE ETHER COMPOSITIONS HAVING ENHANCED MELT FLOW

[75] Inventor: Robert J. Axelrod, Glenmont, N.Y.

[73] Assignee: General Electric Company, Pittsfield, Mass.

[21] Appl. No.: 312,963

[22] Filed: Oct. 20, 1981

[51] Int. Cl.³ .................... C08G 65/44; C08K 5/53; C08L 71/04
[52] U.S. Cl. .................................. 524/139; 524/611; 525/132; 528/167; 528/212; 528/218
[58] Field of Search .............. 524/139, 611; 525/132; 528/167, 212, 218

[56] References Cited

U.S. PATENT DOCUMENTS

| | | | |
|---|---|---|---|
| 3,257,357 | 6/1966 | Stamatoff | 528/212 |
| 3,257,358 | 6/1966 | Stamatoff | 528/212 |
| 3,306,874 | 2/1967 | Hay | 528/212 |
| 3,306,875 | 2/1967 | Hay | 528/212 |
| 4,129,551 | 12/1978 | Rüeter et al. | 524/139 |
| 4,172,929 | 10/1979 | Cooper et al. | 521/139 |
| 4,191,685 | 3/1980 | Haaf et al. | 524/139 |

Primary Examiner—Lester L. Lee
Attorney, Agent, or Firm—Hedman, Casella, Gibson, Costigan & Hoare

[57] ABSTRACT

Thermoplastic molding compositions of a polyphenylene ether resin and optionally an impact modifier are improved by addition of a minor amount of tribenzylphosphine oxide which depresses the viscosity and enhances the melt flow of the resin.

10 Claims, No Drawings

MODIFIED POLYPHENYLENE ETHER COMPOSITIONS HAVING ENHANCED MELT FLOW

BACKGROUND OF THE INVENTION

The polyphenylene ether resins are a well-known family of linear thermoplastic engineering resins. A wide variety of these resins and a number of methods for their preparation are disclosed in Hay, U.S. Pat. Nos. 3,306,874 and 3,306,875, as well as in Stamatoff, U.S. Pat. Nos. 3,257,357 and 3,257,358.

It is a characteristic of the thermoplastic polyphenylene ether resins that they have a high viscosity in their molten state. This characteristic places a comparatively low limit on the rate at which the resins can be molded at safe temperatures in injection molding machines, and increases the power required to maintain a given rate of production from extrusion machines operating at a safe temperature. By "safe" is meant a temperature which does not cause depolymerization, oxidation or other degradation of the resin. Attempts have been made to employ organic compounds as viscosity depressants. For instance, it is known that triphenyl phosphates can be used as a processing aid to depress the melt viscosity of molten polyphenylene ether resins.

INTRODUCTION TO THE INVENTION

It has now been discovered that the viscosities of the polyphenylene ether resins are decreased at their ordinary processing temperatures when a small amount of tribenzylphosphine oxide is included with the resins.

As little as 0.1 percent (based on the combined weights of the resinous ingredients) is effective in producing a reduction in the viscosity of the resin composition at any given melt temperature. Dramatically larger depressions in the viscosity occur as the tribenzylphosphine oxide content is increased.

In comparison with triphenyl phosphate of the prior art, tribenzylphosphine oxide is far more effective, on a weight for weight basis, in reducing the viscosity of molten polyphenylene ether.

DESCRIPTION OF THE INVENTION

The polyphenylene oxide resins useful in accordance with the present kinds of compositions are, as previously indicated, individually well known and readily available. There are, however, various preferred composition components. These are primarily ones commonly having applications for which high impact strength is particularly desirable.

The preferred polyphenylene ethers are homo- and copolymers of the formula:

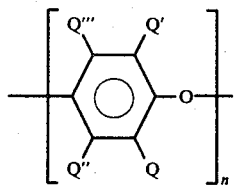

wherein Q, Q', Q" and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q''', in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene) ether.

Among such modifying resins are styrene resins, which is intended broadly throughout this disclosure to include polystyrene, poly p-methylstyrene and polychlorostyrene, as well as polystyrenes which have been modified by admixture with natural or synthetic rubber and copolymers or terpolymers of styrene and elastomeric polymers, e.g., conjugated dienes. Such materials are known in the art and can be obtained commercially or prepared by procedures described in the literature.

In addition, the molding compositions of the present inventin can contain one or more of the supplementary non-resinous agents which have been customarily present in polyphenylene ether resin molding compositions to improve certain other physical and chemical properties of the moldings. The agents include flame retardants, plasticizers, antioxidants, strengthening fibers (for example glass fibers and graphite whiskers), mineral fillers, abrasion resistant components, dyes, and pigments. Many of such agents are disclosed in said U.S. Pat. No. 4,172,929 to Cooper et al.

In general, the polyphenylene ether resin is present in the molding composition to the extent of at least 10%, by weight, this being about the smallest proportion which provides the benefits of the present invention. This resin can be the only component present.

The auxiliary thermoplastic resins are generally present in an amount between about 10% and 90% of the weight of the composition, the range of 30% to 70% being preferred so as to provide molded products which possess to a substantial extent the beneficial properties both of the polyphenylene ether resin component and of the auxiliary resin component.

The supplementary non-resinous agents are present in total amount between about 1% and 50%, so as to provide the benefits which these materials have conferred in the past on shaped molded articles made from thermoplastic resins.

The present invention thus provides an engineering grade thermoplastic molding composition containing more than 10% by weight of a thermoplastic polyphenylene ether resin and a small but effective amount (preferably between 0.1% and 15% of the total weight of thermoplastic components therein) as latent flow promoter for said resin, of tribenzylphosphine oxide.

The molding compositions of the present invention can be prepared by admixing the components together, or by admixing them separately, to form a free-flowing composition which is of suitable particle size for use as direct feed to molding machines.

However, it will often be more advantageous to form the components (including the tribenzylphosphine oxide) into a homogeneous melt, preferably under a blanket of inert gas, and then to form solid particles of desired size from the melt, either by the extrusion, cooling and chopping method, or by solidifying the melt in any convenient way and grinding the resulting product to desired particle size.

The invention is further illustrated by the examples which follow. These examples are best embodiments of the invention, and the invention is not to be construed as limited thereto. Parts are by weight unless otherwise stated.

EXAMPLES 1-5

A base molding composition is prepared by heating a mixture of 40 parts by weight of poly(2,6-dimethyl-1,4-phenylene ether) resin (PPO, General Electric Co.) and 60 parts by weight of a rubber-modified high impact polystyrene (Foster Grant's FG834, containing about 9% of polybutadiene). Samples are taken to which are added with stirring tribenzylphosphine oxide in the varying amounts noted below. For comparison purposes, to other samples are added tri(isopropylphenyl) phosphate in the same amounts. The melt viscosity and flow channel values are determined, and test bars are molded from the melts and their principal physical properties are determined. The results are set forth in Table I.

TABLE I

| EXAMPLE | TBPO | K-50 | C.F. | M.V. | N.I. | G.I. |
|---|---|---|---|---|---|---|
| Control | — | — | 13.25 | 2450 | 2.8 | 130 |
| 1 | 0.5 | — | 13.00 | 2200 | 2.5 | 140 |
| 2 | 1.0 | — | 14.75 | 1900 | 2.4 | 120 |
| 3 | 2.0 | — | 17.50 | 1600 | 2.3 | 100 |
| 4 | 6.0 | — | 21.50 | 720 | 2.1 | 50 |
| 5 | 12.0 | — | — | 455 | 1.7 | — |
| 1A* | — | 0.5 | 14.0 | 2300 | 3.0 | 130 |
| 2A* | — | 1.0 | 13.0 | 2150 | 3.2 | 130 |
| 3A* | — | 2.0 | 14.0 | 2150 | 4.1 | 130 |
| 4A* | — | 6.0 | 16.75 | 1700 | 3.6 | 120 |
| 5A* | — | 12.0 | — | 1300 | 3.6 | 130 |

*comparison experiment
Matrix = 40/60 PPO/HIPS
TBPO = tribenzylphosphine oxide
K-50 = tri(isopropylphenyl) phosphates
C.F. = channel flow (inches)
M.V. = melt viscosity, poises at 540° F., 1500 sec$^{-1}$
N.I. = notched izod impact str., ft. lbs./in. of notch
G.I. = Gardner impact str., in lbs.

The above mentioned patents and/or publications are incorporated herein by reference. Obviously, other modifications and variations of the present invention are possible, in the light of the above teachings. For instance, instead of poly(2,6-dimethyl-1,4-phenylene) ether, copolymers such as poly(2,6-dimethyl-co-2,3,6-trimethyl-1,4-phenylene) ether can be used. The compositions can also contain other ingredients such as flame-retardants, drip retardants, plasticizers, anti-oxidants, fillers and/or reinforcements, pigments, coloring agents, in conventional amounts. It is, therefore, to be understood that changes may be made in the particular embodiments of the invention described which are within the full intended scope of the invention as defined by the appended claims.

I claim:

1. A thermoplastic molding composition comprising a structural thermoplastic polyphenylene ether resin, a styrenic resin and a small but effective amount of a flow promoter consisting essentially of tribenzylphosphine oxide, said polyphenylene ether resin being present in an amount greater than 10 percent by weight of the composition.

2. A composition according to claim 1 where the polyphenylene ether resin is a poly-(2,6-dimethyl-1,4-phenylene) ether resin.

3. A composition according to claim 1 in which the styrenic resin is rubber modified and is present in an amount from 10% to 90% of the composition.

4. A composition according to claim 3 wherein the resin is a polybutadiene modified polystyrene resin.

5. A composition according to claim 1 wherein the weight of said flow promoter is between 0.1% and 15% of the total weight of thermoplastic components therein.

6. A method for the preparation of a composition comprising a structural thermoplastic polyphenylene ether resin and a styrenic resin, said composition having decreased melt viscosity, which comprises forming a melt containing at least 10% by weight of the polyphenylene ether resin and between 0.1% and 15%, based on the weight of the polyphenylene ether resin and styrenic resin combined, of tribenzylphosphine oxide, cooling the melt until solid, and comminuting the solid into a particulate state.

7. A composition according to claim 1, which includes a mineral filler.

8. A composition according to claim 1, which includes a fire retardant.

9. A composition according to claim 1, which includes a fibrous strengthening agent.

10. A composition according to claim 1, which includes a coloring agent selected from the group consisting of dyes and pigments.

* * * * *